United States Patent

[11] 3,568,048

[72] Inventor William A. Robinson
 Don Mills, Ontario, Canada
[21] Appl. No. 782,262
[22] Filed Dec. 9, 1968
[45] Patented Mar. 2, 1971
[73] Assignee McPhar Geophysics Limited
 Don Mills, Ontario, Canada

[54] THREE COIL SYSTEM FOR GEOPHYSICAL PROSPECTING UTILIZING MAGNETIC TIME TRANSIENTS
 8 Claims, 8 Drawing Figs.

[52] U.S. Cl. .................................................. 324/8
[51] Int. Cl. .................................................. G01v 3/00
[50] Field of Search ........................................ 324/8

[56] References Cited
 UNITED STATES PATENTS
2,468,968 5/1949 Felch et al. .................... 324/8X
2,694,793 11/1954 Martin ........................... 324/8X
2,931,974 4/1960 McLauglin et al. ............ 324/8
3,149,278 9/1964 Cartier et al. ................. 324/8X
3,389,331 6/1968 Vexler ........................... 324/8
3,391,335 7/1968 Patton et al. .................. 324/8

Primary Examiner—Gerard R. Strecker
Attorney—Douglas S. Johnson

ABSTRACT: A method and apparatus for detecting geophysical anomalies by measuring the naturally occurring audio frequency transient magnetic fields (AFMAG fields) in two planes comprising utilizing three orthogonal coils and processing their output voltages in appropriate proportions to give the effect of an equivalent coil system comprising two pairs of coils with each coil of each pair having its axis inclined at 45° to the horizontal and at 90° to the axis of the other coil of such pair, one pair of such equivalent coils lying in one vertical plane and the other pair of such equivalent coils lying in another vertical plane.

INVENTOR.
WILLIAM A. ROBINSON.
BY Douglas J. Johnson

*INVENTOR.*
WILLIAM A. ROBINSON.
BY Douglas S. Johnson

THREE COIL SYSTEM FOR GEOPHYSICAL PROSPECTING UTILIZING MAGNETIC TIME TRANSIENTS

FIELD OF INVENTION

This invention relates to a method and means of geophysical prospecting utilizing the measurement of naturally occurring magnetic time transients in two planes.

RELATED INVENTION

A related invention is a Method and Means of Geophysical Prospecting Utilizing Combined Electromagnetic and Time Transient Fields as disclosed in my copending application Ser. No. 782,261.

BACKGROUND OF THE INVENTION

It is known as discussed in U.S. Pat. No. 3,149,278 that naturally occurring electromagnetic fields exist having electric and magnetic fields components in the audiofrequency range with components of particular interest in the 100 to 2,000 cycle per second range. It is also known that in the absence of local conductors the naturally occurring magnetic field components have a random direction but lie in a horizontal plane. The presence of a local conductor or a local magnetic body however changes the magnitude and direction of those naturally occurring audiofrequency magnetic field components (the AFMAG fields) so that they are no longer random in direction nor are they completely horizontal.

The present airborne AFMAG system detects the presence of conductive anomalies by measuring the deviation from horizontal of the natural magnetic field vectors. The detection system which is used consists of two coils towed in a "bird" behind an aircraft at a distance of 200 feet or more, the two coils being mounted with their axes perpendicular to one another and each axis at 45° to the horizontal.

When the field vector in space is horizontal the voltages induced in the two coils are equal and their ratio is unity regardless of amplitude variations of the field vector.

If the field vector is inclined above or below the horizontal the voltage induced in one of the coils is greater than that induced in the other of the coils. The ratio of the two coil voltages is determined by the angle of tilt but is again independent of the amplitude of the field vector.

Such a system has the ability to measure in the plane of the coils such time independent AFMAG field anomalies such as the inclination from horizontal of the field vector and to identify the angle as being above or below the horizontal, and to make the measurement independent of changes in the amplitude of the field vector.

The reason that two mutually perpendicular coils are used is to ensure that their mutual coupling is a minimum so that voltages induced in one coil are not transferred to the other coil by mutual coupling as otherwise the measured ratio of the induced voltages would be different than the true value. Also great care is taken to ensure that the two mutually perpendicular coils are isolated as much as possible from any conducting material which would cause a change in the mutual coupling between the two coils giving rise to false signals from the coils.

While it has long been considered desirable to measure the time independent deviations in the AFMAG in more than one plane or direction the inherent problem of changing the mutual coupling of all the coils by the use of a second pair of coils mounted in a different plane has precluded the development of a reliable system.

SUMMARY OF THE INVENTION

It is therefore the principal object of this invention to provide a method and means of measuring the AFMAG fields in two different planes simultaneously without giving rise to anomalous readings by virtue of adversely interacting mutual coupling effects of a multiplicity of coils.

More particularly it is the object of the invention to effect the measurement of the AFMAG fields in two planes through the utilization of three mutually perpendicular coils whose mutual coupling is zero or at least very small.

BRIEF DESCRIPTION OF THE DRAWING

The invention will be more fully understood from the following detailed description taken with the accompanying drawings in which.

DETAILED DESCRIPTION OF INVENTION

Figure 1A:
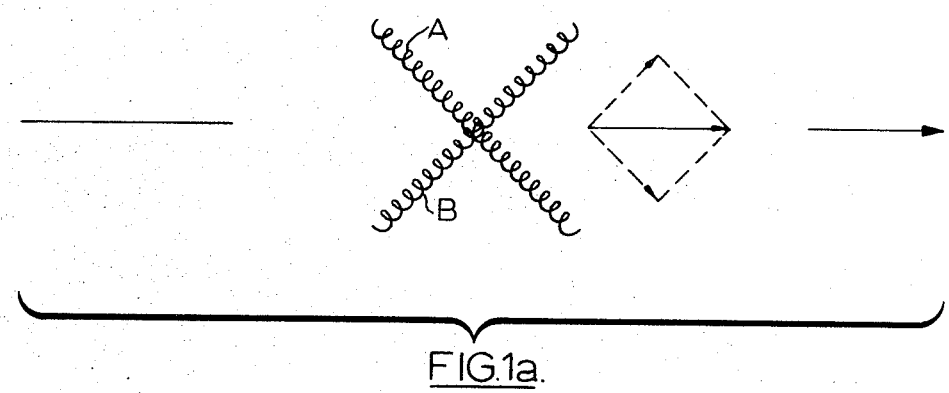
FIG. 1a is a diagrammatic view illustrating a pair of mutually perpendicular detector coils being towed along the line of the horizon in the presence of an undisturbed naturally occurring magnetic field, that is AFMAG field, having a horizontal field vector, the axes of the coils being disposed at 45° to the horizon.

With reference to FIG. 1a there is illustrated the usual arrangement of two coils A and B having their axes arranged in a vertical plane which is oriented in the flight direction at 90° to one another so that their mutual coupling is zero on a minimum. These coils are normally trailed behind an aircraft in a suitable stable "bird" or vehicle with their axes at 45° to the horizontal and magnetic field components in such vertical plane produce voltages in the coils, which voltages after suitable amplification are transmitted by a suitable telemetering system to the aircraft where they are passed through a suitable filtering system to select the desired voltage or signal frequency, and the selected signal is normally rectified and fed to a ratio detector.

It will be appreciated that if the field vector of the transient magnetic or AFMAG fields is horizontal as illustrated in FIG. 1a that is the fields are undisturbed by local conductors or magnetic bodies and the pickup factor of the coils A and B is identical then each coil will have the same voltage generated therein and their signals will cancel out or provide a ratio of 1.

Figure 1B:
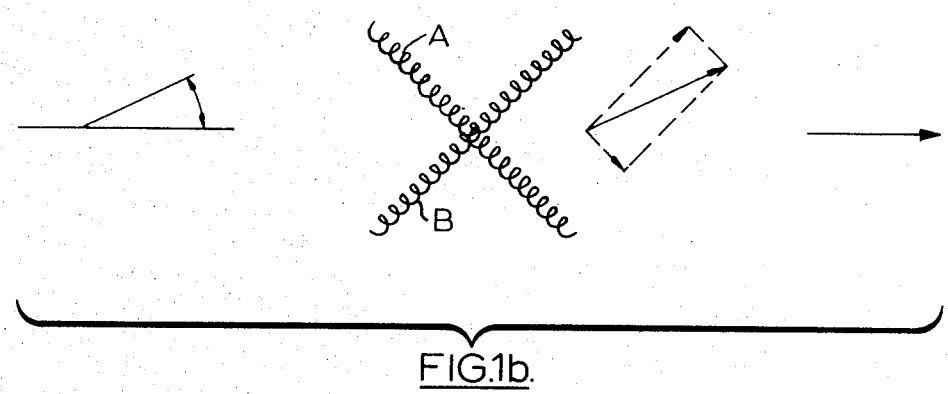
FIG. 1b is a view similar to FIG. 1a but with the field vector inclined upwardly of the horizon.

However, if the direction of the fields should be tilted upwardly from the horizon as illustrated in FIG. 1b the field will produce a substantially greater signal in coil A than in coil B because the field is more nearly aligned with the axis that is, more closely coupled to the coil A than B and this relative signal difference can readily be detected to indicate such field deviation from normal to indicate the presence of an influencing conductor or magnetic body.

Figure 1C:
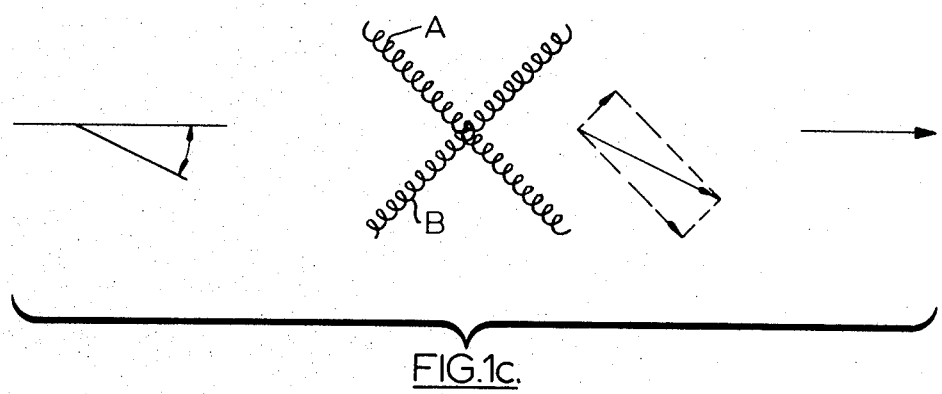
FIG. 1c is a view similar to FIG. 1b but with the field vector inclined downwardly of the horizon.

Similarly as illustrated in FIG. 1c if the direction of the fields should be tilted downwardly from the horizontal the field will produce a greater signal in the coil B than the coil A which can readily be detected.

Figures 2, 3:
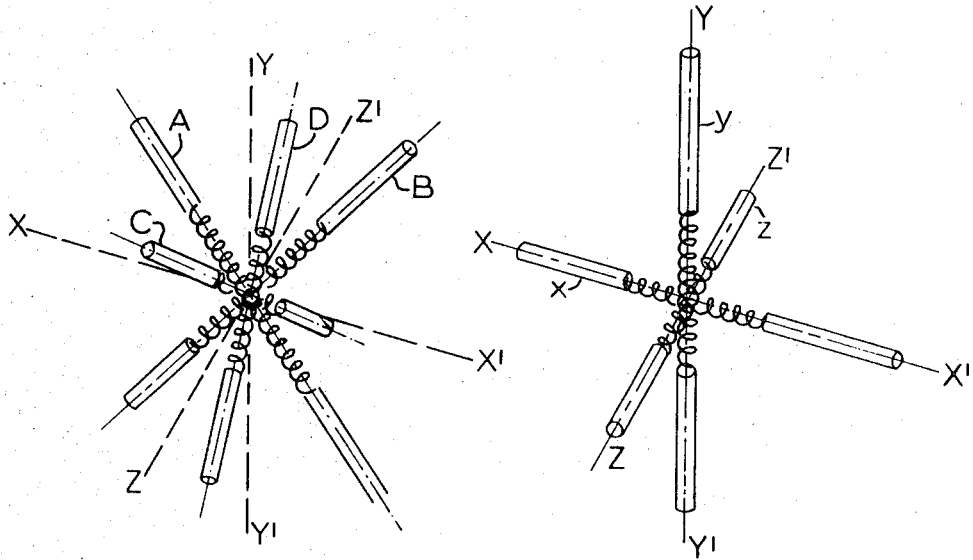
FIG. 2 is a diagrammatic view illustrating the attitude of the coils previously considered necessary to measure the AFMAG fields in two orthogonal direction i.e. parallel and perpendicular to the direction of flight.
FIG. 3 is a diagrammatic view illustrating the coil arrangement of the present invention to measure the AFMAG fields in two different orthogonal planes.

In FIG. 2, X–X$^1$ is intended to represent a horizontal line lying in the direction of flight of the towing aircraft (not shown). Y–Y1 is a vertical line and Z–Z$^1$ is a horizontal line perpendicular to the line X–X$^1$, all lines intersecting at 0. Thus XY is a vertical plane oriented in the direction of flight. YZ is a vertical plane oriented at 90° to the direction of flight. XZ is a horizontal plane perpendicular to both the XY and YZ planes.

Referring to FIG. 2, the axes of the two coils required to make the measurement in the direction of flight according to present practices are located in the XY plane. They are coils A and B at 90° to each other and at 45° to the vertical and to the horizontal.

The axes of two coils that would be required according to present practices to make a similar measurement in the YZ plane would be C and D in the YZ plane, at 90° to each other and at 45° to the vertical and to the horizontal. It will be noted that if two such coil systems were located as described, all of the coils could not be mutually perpendicular. Consequently there would be mutual coupling between the two coil systems and there would also be mutual coupling introduced between the coils of each system due to the presence of the coils in the other system. Because of these mutual coupling, errors would be introduced in the angle measurements and such a system could not be operated with practical or reliable results.

Figures 4, 5:
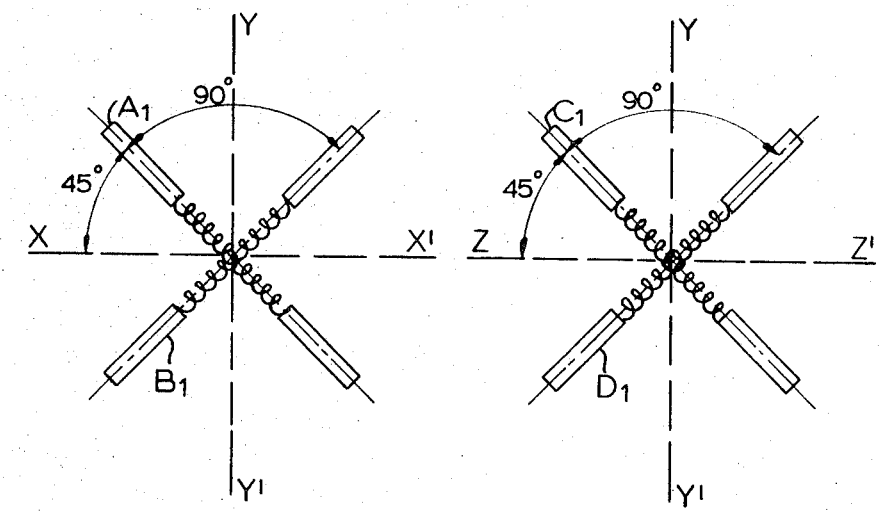
FIG. 4 is a diagrammatic view of the equivalent cost arrangement that can be obtained from the coils physically located on the X–X' and Y–Y' axes.
FIG. 5 is a diagrammatic view of the equivalent coil arrangement than can be obtained from the coils physically located on the Z–Z' and Y–Y' axes.

In resolving the above problems it has been found that the measurement of the AFMAG fields in the two perpendicular planes can be effected by means of three coils which are all mutually perpendicular to each other and therefore have zero or minimum coupling by proportioning the voltages generated in three coils as will be more fully explained with reference to FIG. 3, 4 and 5.

In FIG. 3, three coils $x$, $y$ and $z$ are located in accordance with the invention in mutually orthogonal relation, the coils be shown in the simplest relationship namely with their axes coinciding with the lines or axes $X-X^1$, $Y-Y^1$ and $Z-Z^1$ respectively. The three coils $x$, $y$, $z$ are constructed in the same manner so that their electrical properties are as nearly identical as possible. In particular, the product of $N$ (the number of turns on the coil) and $A_e$ (the cross-sectional area enclosed by the windings of an air cored coil or the equivalent air core area of an iron cored coil) is made the same for each coil.

Figure 6:
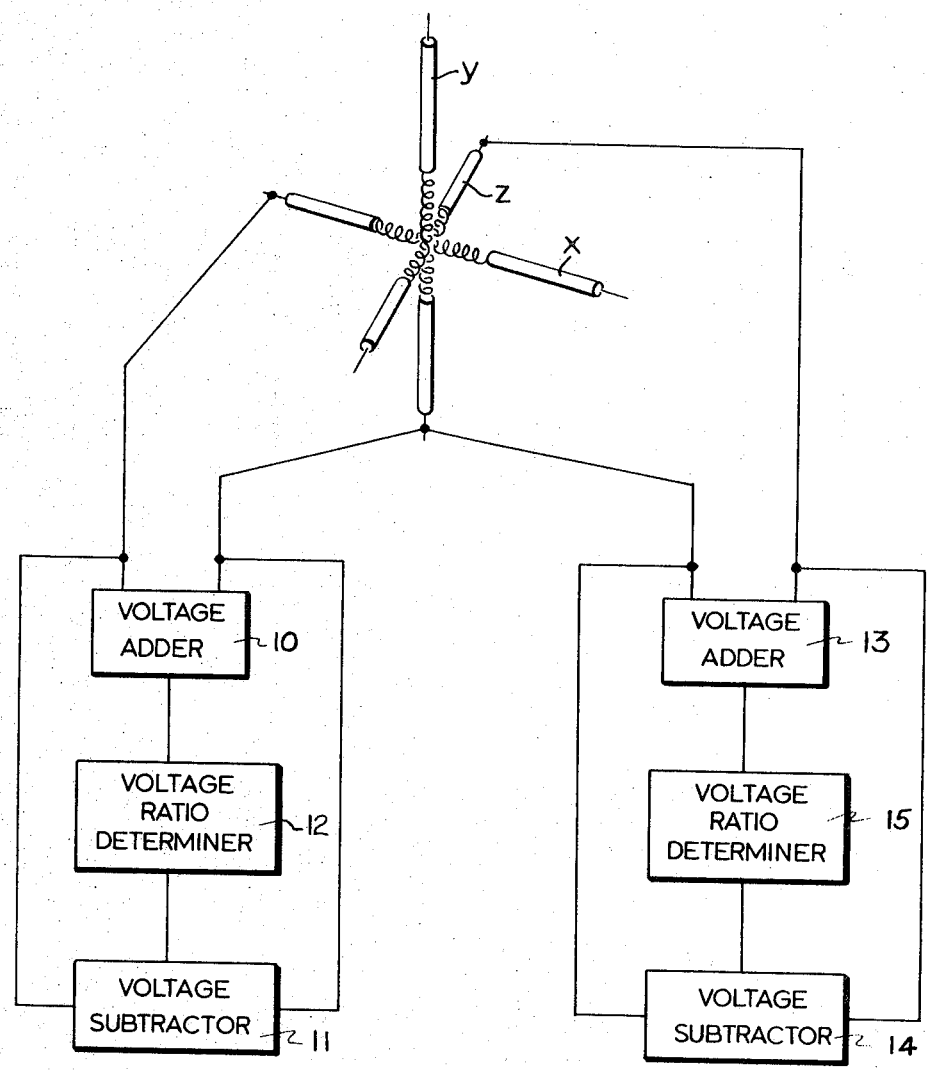
FIG. 6 is a block diagram illustrating the manner in which the voltages produced in the coils of the coil arrangement of FIG. 3 are processed.

It will be understood that these coils will produce an output voltage of $V_x$, $V_y$ and $V_z$ respectively when the coil system is located in an electromagnetic field. In order to effect the desired measurements of the field these voltages are combined in electronic circuits in the following manner:

shown in FIG. 6 $V_x$ and $V_y$ are added in voltage adder circuit 10 to obtain an output voltage $V_x + V_y$, $V_x$ and $V_y$ are subtracted in voltage subtractor circuit 11 to obtain an output voltage $V_x - V_y$. It can readily be shown according to mathematical analysis as detailed in my said copending application Ser. No. 782,261 Method and Means of Geophysical Prospecting Utilizing Combined Electromagnetic and Time Transient Fields that $V_x + V_y$ is the output voltage that would be obtained from a single coil whose axis is in the XY plane at 45° to the X-X¹ axis and whose pickup factor is $\sqrt{2}$ times that of either the $x$ or $y$ coils. Thus by adding the output voltages of coils $x$ and $y$ the same result is achieved as would be obtained with an equivalent coil $A_1$ disposed in the XY plane at 45° to the horizontal as illustrated in FIG. 4. Similarly $V_x - V_y$ produces the same result as would be obtained with another equivalent coil, coil $B_1$ also in the XY plane and whose axis is also 45° to the horizontal. However, the axes of these two equivalent coils are at 90° to each other as required for AFMAG measurements in the XY plane and the pickup factors of the two equivalent coils $A_1$ and $B_1$ are equal as desired though they are $\sqrt{2}$ times the pickup factors of the $x$ or $y$ coils.

It will thus be seen that the two equivalent coils $A_1$ and $B_1$ may be used to make the transient magnetic or AFMAG field angle measurement in the XY plane. The output voltages ($V_x + V_y$) and ($V_x - V_y$) are processed in accordance with the present practice with two coils in the subsequent voltage ratio determiner circuitry 12 (FIG. 6) as if they had come from two physical coils represented by coils $A_1$ and $B_1$, that is the ratio of these voltages is determined to determine any deviation of the AFMAG fields from the horizontal in the XY plane.

In a similar manner $V_y$ and $V_z$ are used to obtain voltages ($V_y + V_z$) and ($V_y - V_z$) in the voltage adder and subtractor circuits 13 and 14 respectively (FIG. 6). These voltages are the output voltages of equivalent coils $C_1$ and $D_1$ in the YZ plane as illustrated in FIG. 5. The equivalent coils $C_1$ and $D_1$ may be used to make the AFMAG field angle measurement in the YZ plane. To do this the output voltages ($V_y + V_z$) and ($V_y - V_z$) are again processed in the subsequent voltage ratio determiner circuitry 15 as if they had come from physical coils represented by coils $C_1$ and $D_1$ as is the case of the voltages ($V_x + V_y$) and ($V_x - V_y$) and any deviation of the AFMAG fields from the horizontal in the YZ plane is determined.

From the foregoing it will be apparent that through the use of the three mutually perpendicular coils $x$, $y$, and $z$ the deviations of the AFMAG field vector from the horizontal can simultaneously be measured in the direction of flight and at 90° to the direction of flight thereby permitting through the combination of these measurements the determination of the actual direction in space of the field vector at the point of measurement.

It will be understood that such 3-dimensional determinations of the AFMAG field vector will provide not only an indication of the presence of an influencing geophysical conductor or magnetic body but also some indication of its characteristics.

In practice it is desirable to shock mount the coils in the "bird." It will be understood that such coils can be shock mounted as desired to provide for some relative movement between the bird and coils while at the same time the mutually perpendicular coil arrangement can be maintained constant.

The coils $x$, $y$, $z$, may if desired be air core coils or they can be coils with high permeability cores such as ferromagnetic cores or the like.

The useful frequencies of the AFMAG fields to be measured range approximately over the audiofrequency range and it will be understood the appropriate frequencies desired can be selected by filtering. Moreover it will further be appreciated as more fully explained in my said copending application Ser. No. 782,261 one or more of the coils $x$, $y$, $z$ may be utilized to carry out electromagnetic measurements, that is measurements of a locally generated electromagnetic field created by a transmitter in or on the aircraft. Such electromagnetic measurements may be carried out at an appropriately different frequency than the frequency or frequencies at which the AFMAG measurements are being carried out to prevent any interference between the two measurements. While the simplest and preferred attitude of the three coils $x$, $y$ and $z$ in space is that illustrated in FIG. 3 enabling through the simple addition and subtraction of the coil voltages the creation of the desired equivalent coils $A_1$, $B_1$, $C_1$ and $D_1$, it is possible to produce such equivalent coils with a different attitude in space of the physical coils $x$, $y$, $z$, so long as they are maintained in relative orthogonal relation. Thus for example, the physical coils $x$ and $y$ could be oriented in space to constitute the coils $A_1$ and $B_1$. It can be mathematically shown that by the combination of a proper proportion the voltages of the coils $x$ and $y$ an equivalent coil in the YZ plane can be obtained, the effective output voltage of which can be combined with the coil $z$ to create the equivalent coils $C_1$ and $D_1$. It will also be understood that while preferably for simplicity the pickup factors of the coils $x$, $y$ and $z$ are made equal they do not necessarily have to be the same so long as they are known and the appropriate compensation is made by proportioning the voltage outputs of the coils corresponding to their respective pickup factors and attitude in space.

These and other variations and modifications may be made in utilizing or carrying out the invention without departing from the spirit thereof or scope of the appended claims.

I claim:

1. A method of simultaneously measuring any deviations of time transients magnetic fields from the horizontal in two planes comprising orienting three mutually perpendicular coils having predetermined pickup factors in space, whereby voltages are generated therein by the time transient magnetic fields combining the voltage outputs of said coils in a predetermined relationship governed by the actual attitude of said coils in space relative to the horizontal and their pickup factors to produce process voltages corresponding to those obtainable from an equivalent coil system comprising a first pair of coils lying in a first plane having their axes mutually perpendicular and at 45° to the horizon and a second pair of coils lying is a second plane and having their axes mutually perpendicular and at 45° to the horizon, and processing said process voltages to determine any deviation of the transient magnetic fields from the horizontal in either said first plane or said second plane.

2. A method of simultaneously measuring any deviations of time transient magnetic fields from the horizontal in two planes comprising orienting in space three mutually perpendicular coils having essentially the same pickup factors with one coil essentially vertical and the other two essentially horizontal, adding and subtracting voltages generated by the time transient magnetic fields in said vertical coil and each of said horizontal coils and determining the ratio of such added and subtracted voltages obtained from said vertical coil and each of said horizontal coils.

3. A method as claimed in claim 2 in which voltages of selected frequencies in substantially the audio range are added and subtracted according to claim 2 and their ratios determined.

4. A method as claimed in claim 3 in which coils are towed behind an aircraft and the voltages generated in said coils are fed to said aircraft and the sum and difference of the voltages generated in said essentially vertical coil and each of said horizontal coils is measured in said aircraft and their ratios determined in said aircraft.

5. A method as claimed in claim 4 in which one of said horizontal coils is essentially aligned in the direction of flight and the other of said essentially horizontal coils is essentially perpendicular to the direction of flight.

6. A method as claimed in claim 2 in which an electromagnetic field of a selected frequency is created at said aircraft and voltages generated in said vertical coil are delivered to and measured in said aircraft.

7. Means for simultaneously measuring deviations from normal horizontal polarization of naturally occurring magnetic time transients in two planes comprising three mutually perpendicular coils one oriented substantially vertical and the other two substantially horizontal, means for adding and subtracting the voltages generated in said essentially vertical coil and each of said essentially horizontal coils and means for determining the ratios of said added and subtracted voltages.

8. A method of simultaneously measuring any deviations of time transient magnetic fields from the horizontal in two planes comprising orienting in space three mutually perpendicular coils having essentially the same pickup factors with one coil essentially vertical and the other two essentially horizontal, adding and subtracting voltages generated by the time transient magnetic fields in said vertical coil and one of said horizontal coils and determining the ratio of such added and subtracted voltages to indicate any variations of said time transient magnetic fields from the horizontal in a first direction, adding and subtracting voltages generated by the time transient magnetic fields in said vertical coil and the other of said horizontal coils and determining the ratio of such latter added and subtracted voltages to indicate any variations of said time transient magnetic fields from the horizontal in a second direction at right angles to said first direction.